United States Patent [19]

Wimer et al.

[11] 4,382,581
[45] May 10, 1983

[54] APPARATUS FOR PULLING CABLE THROUGH UNDERGROUND CONDUIT

[75] Inventors: Delbert W. Wimer; Daniel C. Carlson, both of Lake Worth; Edward C. Elwood, Margate; Eugene T. Stewart, Tavernier, all of Fla.

[73] Assignee: Burnup & Sims Inc., Plantation, Fla.

[21] Appl. No.: 161,286

[22] Filed: Jun. 20, 1980

[51] Int. Cl.³ .................................................. B23Q 3/08
[52] U.S. Cl. ........................................... 254/134.3 FT
[58] Field of Search ............ 254/134.3 R, 134.3 FT, 254/134.4; 242/86.5 R; 212/188, 238, 236; 414/705

[56] References Cited

U.S. PATENT DOCUMENTS

| | | | |
|---|---|---|---|
| 2,515,953 | 7/1950 | Dufresne | 254/134.4 |
| 2,896,911 | 7/1959 | Carpenter | 254/134.3 FT |
| 3,160,394 | 12/1964 | Hunter et al. | 254/134.3 R |
| 3,179,375 | 4/1965 | Hamrick | 254/134.4 |
| 3,244,292 | 4/1966 | Elliott | 254/134.3 FT |
| 3,321,184 | 5/1967 | Goss | 254/134.4 |
| 3,463,336 | 8/1969 | Mork | 414/705 |
| 3,887,163 | 6/1975 | Prange | 254/134.3 FT |
| 3,968,952 | 7/1976 | Newell | 254/134.3 |
| 4,213,596 | 7/1980 | Inoue | 254/134.3 R |

Primary Examiner—Robert C. Watson
Attorney, Agent, or Firm—Robert E. Wagner; Ralph R. Rath

[57] ABSTRACT

A cable pulling apparatus includes a winch line on a drum supported on a bed of a vehicle and driven by a motor with a clutch between the motor and drum and a brake associated with the drum. A boom defines a guide for the winch line into a manhole into alignment with an underground conduit and a mandrel is attachable to the winch line. An air gun has one end received into the underground conduit and is expansible into engagement with the conduit and a compressor assembly is attached to the opposite end to propel the mandrel and winch line through the underground conduit. A cable is then attached to the winch line and is drawn through the conduit by driving the drum. A blower and a water pump are also supported on the bed to remove gases and water from the manhole.

6 Claims, 14 Drawing Figures

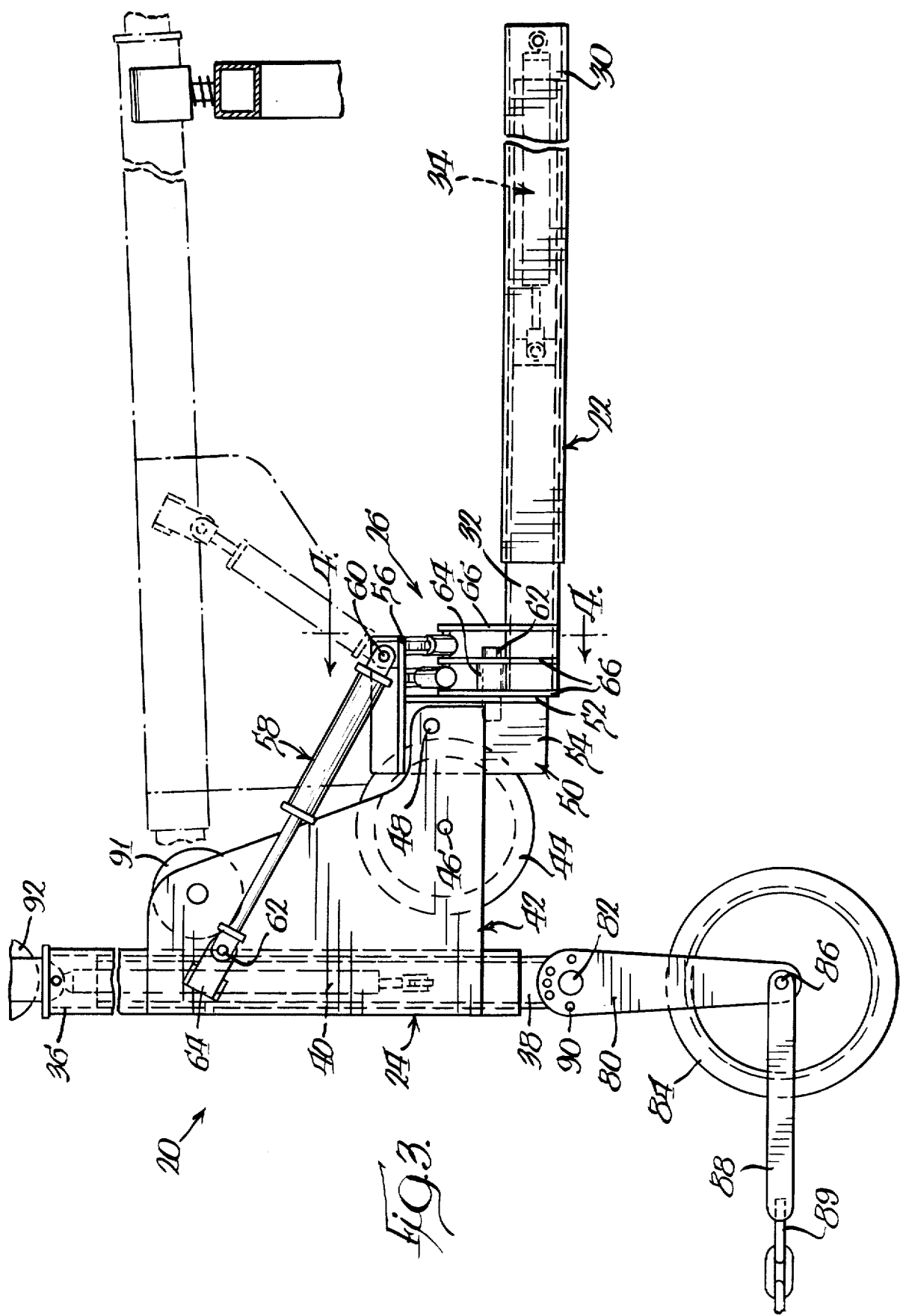

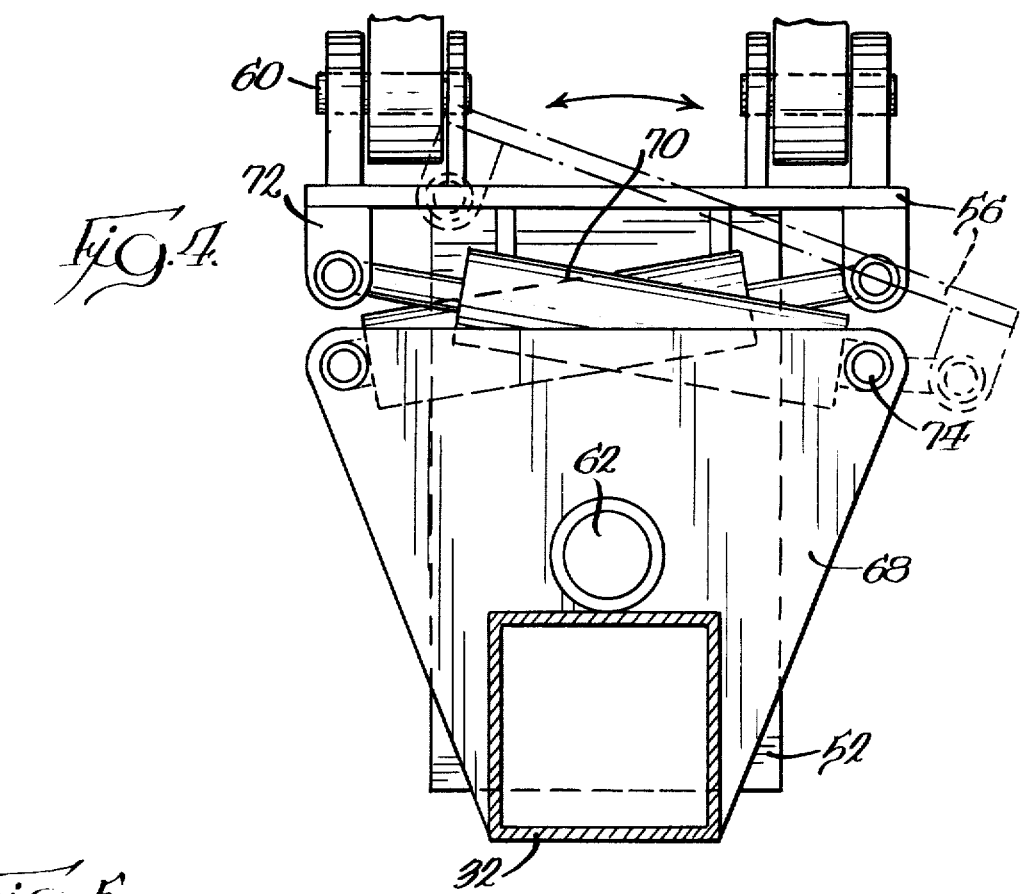
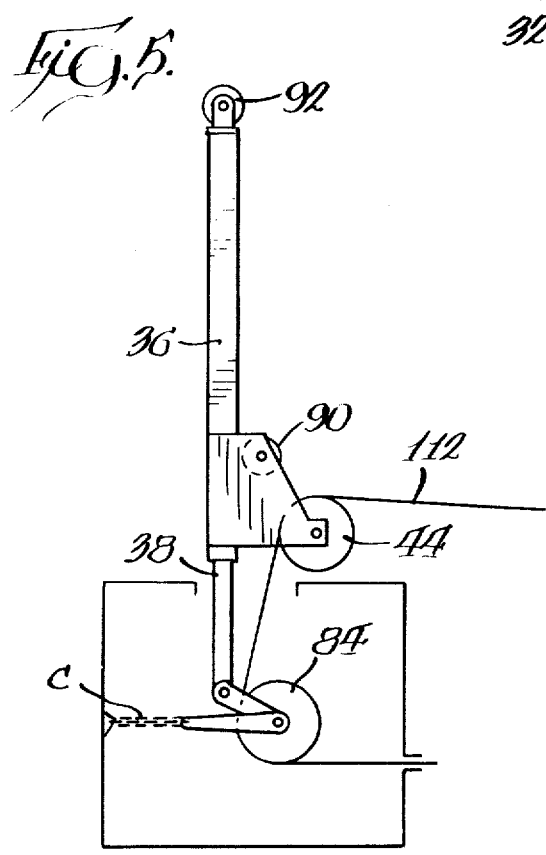
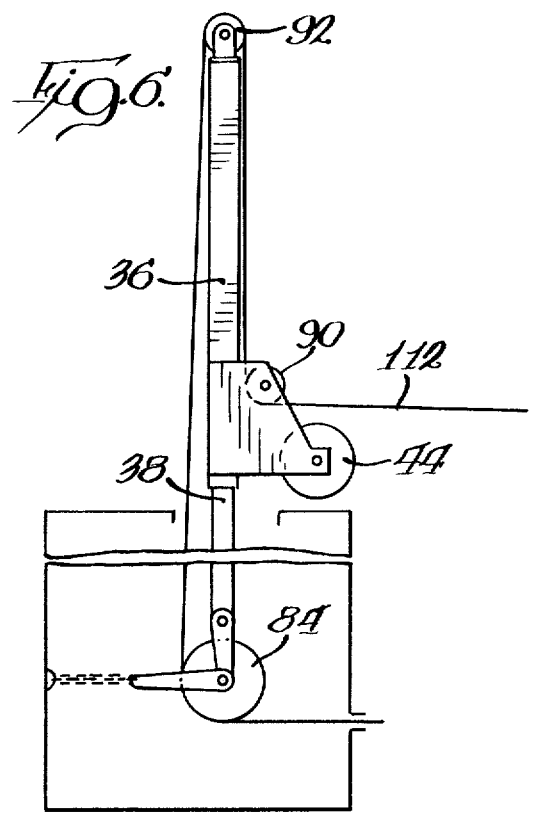

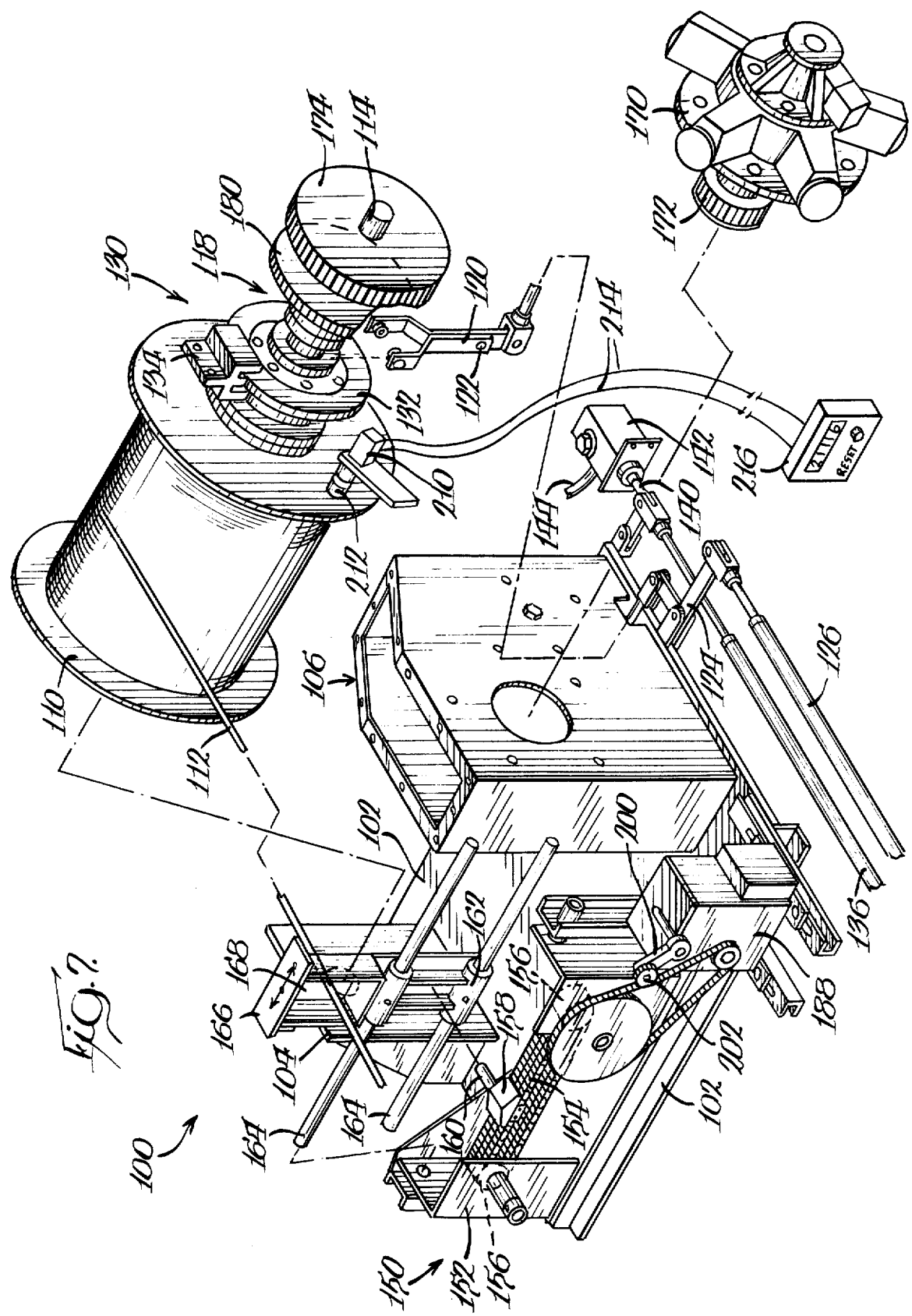

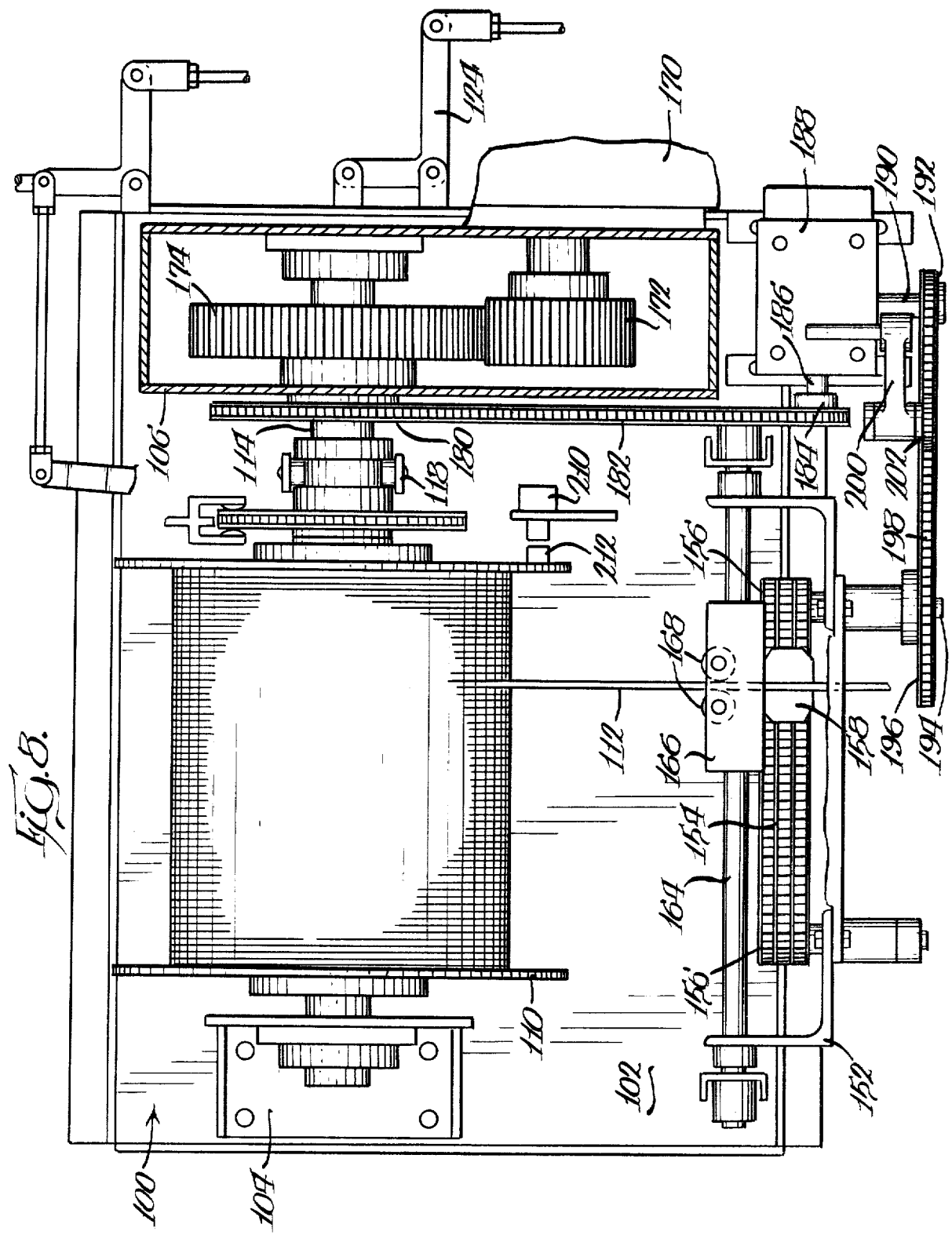

APPARATUS FOR PULLING CABLE THROUGH UNDERGROUND CONDUIT

DESCRIPTION

1. Technical Field

The present invention relates generally to cable feeding apparatus and more specifically to a cable pulling mechanism wherein the winch line used for pulling the cable is blown through the underground conduit for attachment to the cable to be inserted therein.

2. Background Prior Art

The increased use in underground conduit for various cables, such as telephone cables, has necessitated the development of new equipment for economically placing the cable into the conduit below the ground level.

In this respect, many types of cable pulling mechanisms have been developed and examples of such types are disclosed in U.S. Pat. Nos. 3,226,088; 3,244,292; and 3,306,581. Most of the cable pulling equipment that has been developed requires the initial insertion of a wire into the conduit or duct in advance of actually pulling the cable therethrough. For example, in underground telephone conduit systems, a light disposable wire is initially inserted into the conduit and, when the cable is to be placed, a winch line is attached to the wire at one end thereof and the wire is pulled from the conduit to place the winch line therein. The cable is then attached to the winch line and the winch is operated to draw the cable into the conduit.

More recently, mechanisms have been developed for blowing the light wire or line into the conduit which reduces the overall cost of insertion of the light wire. However, such a system requires the additional equipment necessary for initially installing the light wire into the conduit prior to the actual cable insertion.

SUMMARY OF INVENTION

According to the present invention, a cable laying system has been developed wherein the winch line can be fed through the underground conduit without the use of an additional wire by utilizing a system wherein the winch cable is blown through underground conduit which may be as long as 1,000 feet or more.

More specifically, the mechanism for installing cable into an underground conduit consists of a winch line that is supported on a winch drum with a mechanism which is capable of having the winch drum free wheeling during the time the winch line is actually blown through the underground conduit and which can easily be stopped when the winch line reaches the other end of the conduit as well as a drive mechanism which can then be engaged to draw the winch line through the underground conduit after the underground cable has been attached thereto. The apparatus also includes a unique guide mechanism consisting of a boom that is capable of guiding the line during the blowing operation and also guiding the line during the drawing operation. The boom is supported on a platform of a truck and can be manipulated longitudinally, transversely and vertically to be inserted into the center of a manhole with a sheave or bull wheel at the outer end of the boom assembly that is adapted to be aligned with the underground conduit.

According to one aspect of the invention, the apparatus is a completely self-contained and includes a mechanically driven blower, a hydraulically driven drive for the winch drum and hydraulically manipulated fluid rams that are used for manipulating the sections of the boom as well as a hydraulically operated water pump for withdrawing water from the manhole in the event that there is an accummulation of water therein. A separate pressurized hydraulic fluid is utilized to operate the winch disk brake when the cable reaches the opposite end of the underground conduit so that the winch can be stopped much more rapidly upon clearance of the mandrel on the receiving end of the cable.

According to a further aspect of the invention, the cable apparatus also includes a counter for counting the number of revolutions during winch feeding and subtracts the number of revolutions when the winch cable is being wound onto the winch drum so that the operator knows when the cable being inserted is pulled all the way through the underground conduit.

According to a further aspect of the invention, the hydraulic reservoir is located or forms part of the frame structure for the truck body and thereby reduces the overall cost of the completed unit.

BRIEF DESCRIPTION OF SEVERAL VIEWS OF DRAWINGS

FIG. 3 is a side elevation view of the boom assembly for guiding the winch line;

FIG. 4 is an enlarged fragmentary sectional view as viewed along line 4—4 of FIG. 3;

FIG. 5 is a schematic view of the boom assembly in position for pulling cable through the underground conduit;

FIG. 6 is a view similar to FIG. 5 showing an alternate position of the boom for drawing cable through the underground conduit;

FIG. 7 is an exploded perspective view of the winch assembly;

FIG. 8 is a plan view of the winch assembly shown in FIG. 7;

DETAILED DESCRIPTION

Figure 1:
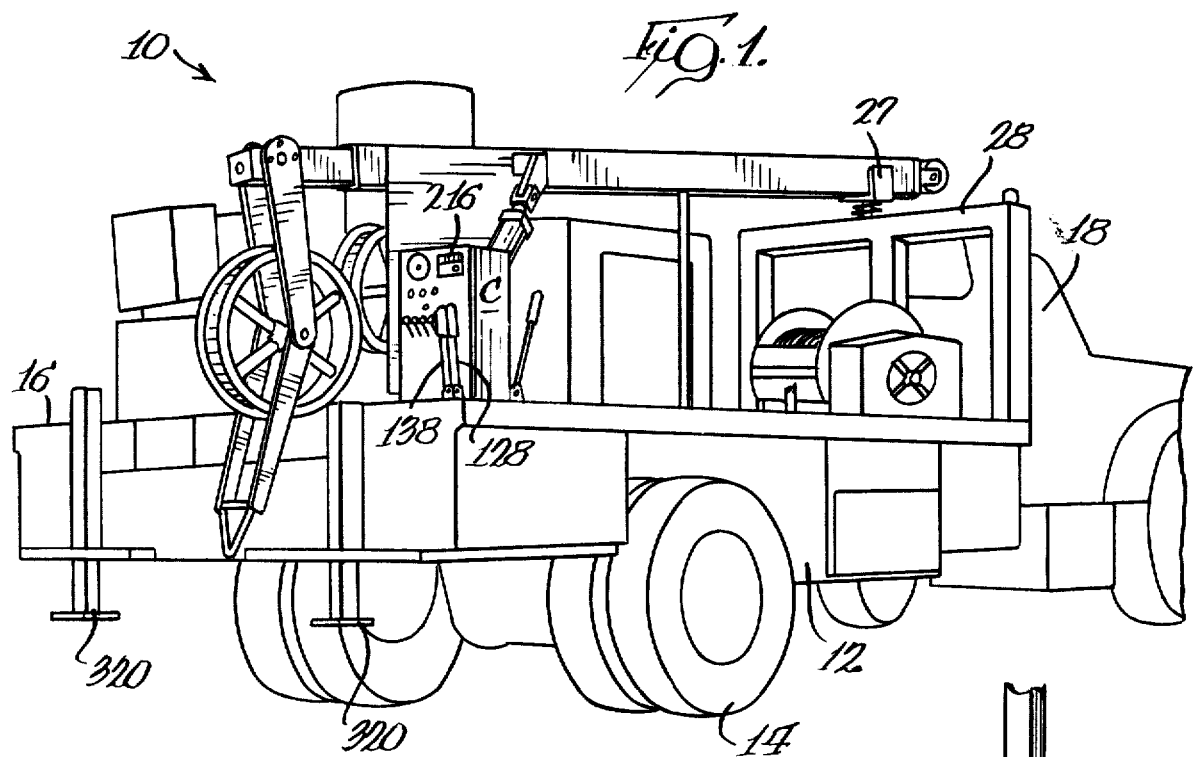
FIG. 1 is a perspective view of the cable pulling apparatus constructed in accordance with the present invention.

While this invention is susceptible of embodiment in many different forms, there is shown in the drawing and will herein be described in detail a preferred embodiment of the invention with the understanding that the present disclosure to be considered as an exemplification of the principle of the invention and is not intended to limit the invention to the embodiment illustrated.

FIG. 1 of the drawings discloses a vehicle, generally designated by reference numeral 10 having a frame 12 supported on wheels 14 and defining a bed 16 which supports all of the cable placing components, as will be described later. Vehicle 10 may be a conventional type truck having a cab 18 which has an engine (not shown) for propelling the vehicle in a well-known manner.

According to the present invention, all of the components necessary for installation of underground cable are supported by the frame 12, more specifically, on trailer bed 16.

Boom Assembly

One of the components that is supported on bed 16 is the boom assembly, generally designated by reference numeral 20 in FIG. 3. Boom assembly 20 includes a generally horizontal telescoping boom 22 and a generally vertical boom 24 which is supported on the outer end of horizontal boom 22 by a coupling 26. Vertical boom 24 is adapted to be moved from the vertical operative position illustrated in FIG. 3 to the dotted line generally horizontal position illustrated in FIG. 3 for transportation and storage. In the stored position illustrated in FIG. 1, the boom has its free end resting in a cradle 27 that is resiliently supported on an upright frame portion 28.

Horizontal boom 22 includes an outer generally rectangular hollow member 30 which is supported in a guide or recess (not shown) on truck bed 16 for generally horizontal movement through a fluid ram (not shown), for a purpose that will be described later. The horizontal boom also includes an inner telescoping section 32 which is adapted to be telescoped into the outer open end of hollow boom member 30 and extended and retracted through a fluid ram 34.

Vertical boom 24 likewise includes a hollow generally rectangular outer boom section 36 and a rectangular inner boom section 38 telescoped into the open end of boom section 36 and extended and retracted through a fluid ram 40. Outer boom section 36 also has a hollow extension 43 defined by a pair of spaced plates (only one being shown in FIG. 3) extending from one side thereof with a pulley or sheave 44 supported between the plates. Pulley 44 is rotatably supported on a pin 46 that extends between the plates. The inner end of extension 42 is pivotally supported by a pin 48 on a cradle structure 50. The cradle structure 50 consists of a flat rear plate 52 and a pair of spaced plates 54 (only one being shown) extending from one face of the plate 52 with the pin 48 extending between the two plates. A generally upper horizontal flat plate 56 extends across the upper edge of plates 52 and 54 and has one end of a fluid ram 58 pivoted thereon through a pin 60. The opposite end of the fluid ram or the piston rod thereof is pivotally connected through a pin 62 to a bracket 64 that is secured to the outer surface of extension 42. Thus, extension and retraction of fluid ram 58 will move the vertical boom 24 from the generally horizontal support position illustrated in the dotted lines in FIG. 3 to the generally vertical position illustrated in solid lines in FIG. 3.

Rear plate 52 of cradle structure 50 has a pin 62 extending therefrom and pin 62 is received into an opening defined in a collar 64 extending between a pair of plates 66 that are supported on the outer end of hollow horizontal boom member 32. A third plate 66 is also spaced from an adjacent second plate through a spacer plate. The entire vertical boom 24 and its supporting structure including cradle 50 are adapted to be pivoted about the axis of pin 62 through a pair of fluid rams 70 that have one end connected to a bracket 72 extending from horizontal plate 56 of cradle 50 and an opposite end connected by pins 74 extending between a pair of plates 66.

Extension and retraction of fluid rams 70 will cause the entire cradle structure 50 to pivot about an axis defined by pin 62.

A pair of arms 80 are pivoted on the lower free end of boom section 38 by a pin 82 and a sheave or bull wheel 84 is rotatably supported between the arms by a pin 86.

A clevis 88 is also supported on pin 86 and has an eyelet 89 on the outer end thereof. Arms 80 have a plurality of openings 90 circumferentially spaced around pin 82 and arms 80 each have a single opening (not shown) for a purpose that will be described later.

Vertical boom 24 has an additional pair of idler sheaves 91 and 92 respectively supported on extension 42 and on the upper end of outer boom section 36. Sheaves 44, 84, 91 and 92 are used to define alternate paths for a winch line as will be described later.

Winch Assembly

The second major component of the cable placing apparatus includes the winch assembly 100 which is generally illustrated in FIGS. 7 and 8 of the drawings. Winch assembly 100 includes a base 102 that has a pair of upstanding support structures 104 and 106 with the second support structure 106 being a hollow rectangular member, as will be described later. A winch drum 110 having a winch line 112 entrained thereon is supported on support structures 104 and 106 for rotation thereon. The winch drum 110 is driven through a shaft 114 with a clutch 118 interposed between drive shaft 114 and the shaft (not shown) supporting the winch drum. Clutch 118 is moved between engaged and disengaged positions through a clevis 120 pivoted about a pivot point 122 on base 102 through a linkage including a bell crank 124 pivotedly supported on base 102 and connected to clevis 122 by a link 125, and an adjustable link 126 extending to control console C (FIG. 1) with a lever 128 secured to the opposite end of adjustable link 126.

According to one aspect of the invention, the winch drum has a hydraulic brake assembly associated therewith for rapidly interrupting the rotation of the winch drum, particularly when the winch line has passed through the underground conduit.

Brake assembly 130 includes a disk 132 that is rotated with shaft 114 and a caliper brake assembly 134 that is supported for movement on a supporting frame structure (not shown). Caliper brake assembly 134 is actuated through a linkage including an adjustable link 136 connected to a lever 138 at one end which is pivotedly supported adjacent the base or bed 16 adjacent control console C. The opposite end of link 136 is connected to an actuating rod 140 of a master brake cylinder 142. Master brake cylinder is connected by a flexible hose 144 to a slave cylinder (not shown) interposed between the frame and caliber brake assembly 134. Thus, the brake cylinder assists in rapidly moving the caliber brake assembly 134 between engaged and disengaged positions.

The winch assembly also includes a level-wind assembly which insures that the winch line is evenly distributed axially across the width of the drum 110 during the winding operation. Level-wind assembly 150 includes a frame structure 152 extending above base 102 which supports an endless chain 154 on a pair of sprockets 156. Drive chain 154 has a drive block 158 secured thereto for movement therewith and drive block has a drive pin 160 which extends between a carriage structure 162 that is supported on a pair of spaced guide rods 164. Carriage structure 162 also has a traversing block 166 secured thereto with the block 166 having a pair of guide rollers 168 rotatably supported thereon. The guide rollers 168 are spaced from each other by a dimension which is substantially equal to the diameter of winch line 112 so that the rotatable guide rollers will guide the line during reeling and unreeling from the drum.

The drive mechanism for the winch drum 110 and the drive chain 154 includes a hydraulic drive motor 170 that has a gear 172 secured to its output shaft with gear 172 being located within the hollow reservoir defined by support structure 106. Gear 172 is in mesh with a driven gear 174 secured to drive shaft 114 and also located within reservoir 106. A sprocket 180 is also supported on drive shaft 114 and an endless chain 182 is entrained over drive sprocket 180 as well as a driven sprocket 184 supported on an input shaft 186 of a reduction gear box 188. The reduction gear box 188 has an output shaft 190 with a driven sprocket 192 supported on output shaft 190. A further shaft 194 is secured to one of the sprockets 156 and has a sprocket 196 supported thereon with an endless chain 198 entrained over sprockets 192 and 196. An idler arm 200 is pivotedly supported on a housing for gear box 188 and has an idler sprocket 202 rotatably supported thereon which engages sprocket chain 198 to adjust the tension thereof.

The winch assembly 100 also has a counting mechanism associated therewith for counting the number of revolutions the drum has rotated during reeling and unreeling of the winch line. The counter assembly includes a counter mechanism 210 which is triggered by a proximity switch 212 that is rotated with drum 110. The counter mechanism 210 is connected through suitable leads 214 to a counter display unit 216 which is mounted on control panel C. The counter mechanism 210 is of the type which has the capability of adding and subtracting the number of revolutions made by drum 110 during the reeling and unreeling of the winch line 112. The operation of the counting mechanism will be described later.

Air Gun

Figure 9:
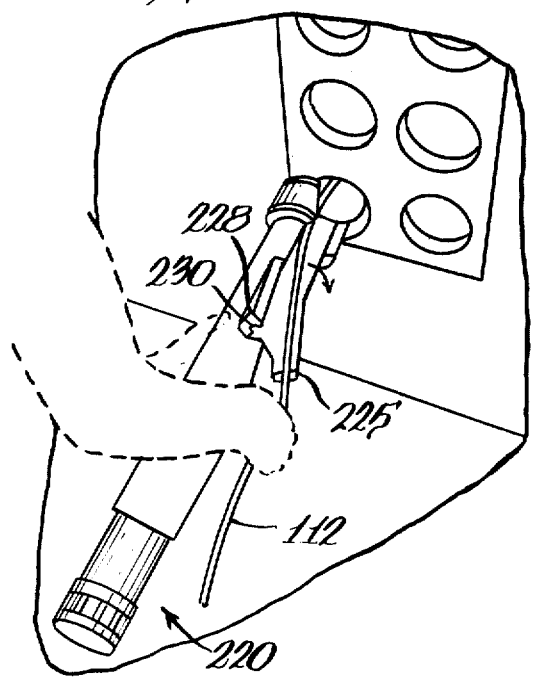
FIGS. 9 through 12 show the steps of positioning winch line into the air gun preparatory to blowing the winch line through the underground conduit.
Figure 10:
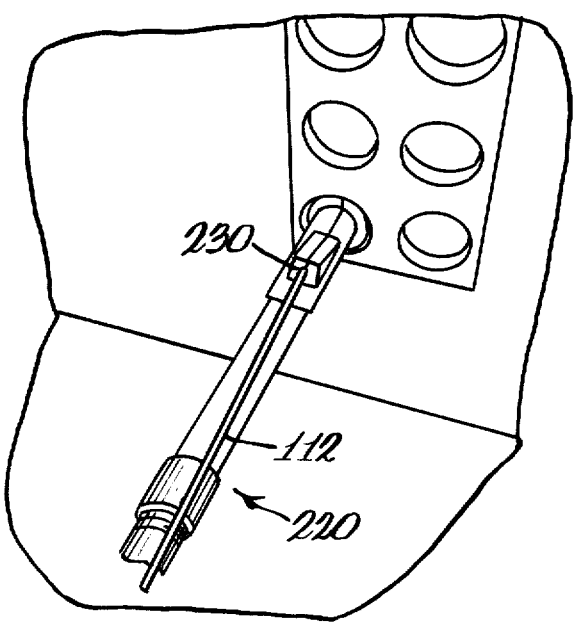
Figure 11:
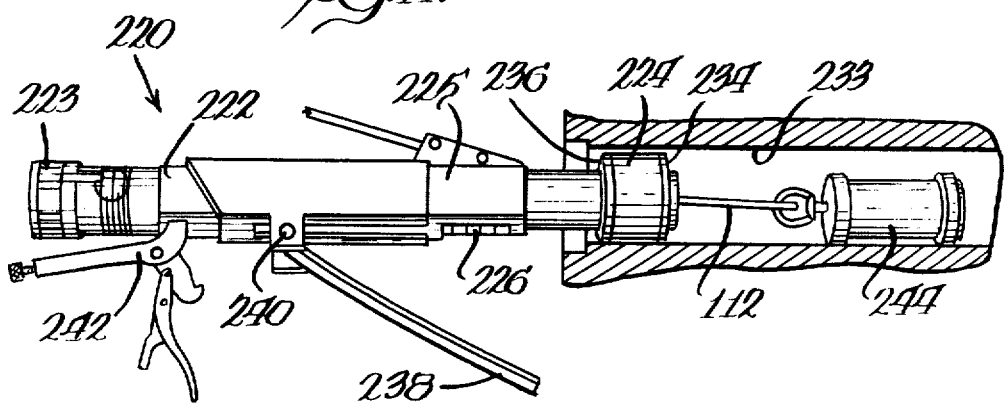
Figure 12:
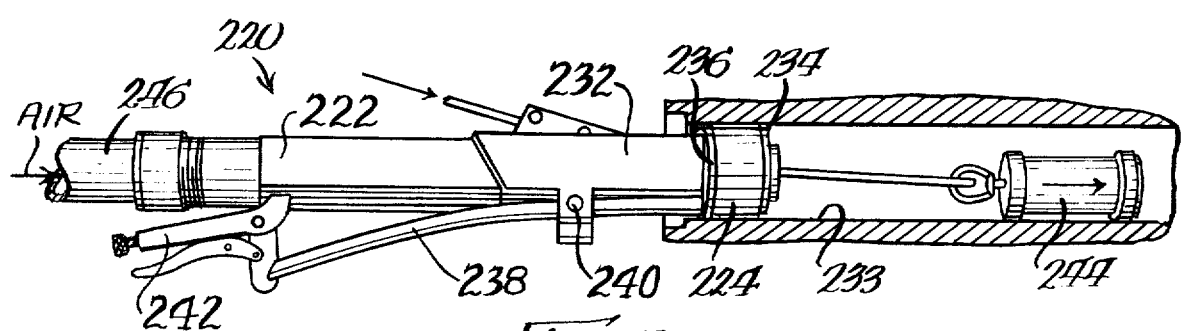

The winch line feeding mechanism also includes a unique air gun which is utilized for forcing the winch line through the conduit and is illustrated in FIGS. 9 through 12. As shown in FIG. 11, the air gun assembly 220 includes a generally tubular housing 222 that is open at both ends and has a quick disconnect coupling 223 at one end adapted to connect an air hose thereto while the opposite end has an expansible rubber ring 224. One end portion, the end portion having the rubber ring thereon, has a door section 225 pivotedly connected by a hinge 226 to housing 222 and has a guide slot 230. The door is held closed by a latch mechanism which will be described later.

The air gun has a sliding mechanism 232 for expanding rubber ring 224 into engagement with the wall of conduit opening 233. For this purpose, the air gun housing 222 has a collar 234 fixed to one end thereof adjacent rubber ring 224. A slidable collar 236 is supported on the periphery of housing 222 adjacent rubber ring 224. Collar 236 is shifted axially on housing 222 by slide mechanism 232 to the position illustrated in FIG. 12. In this position, collars 234 and 236 expand rubber ring 224 into engagement with the wall of opening 233. Also, in this position slide mechanism 232 encompasses door 225 and holds it in a closed position.

Slide mechanism 232 is held in a latched position by a lever 238 pivoted by a pin 240 on slide mechanism 232 with a cam (not shown) on the lever inner end. The outer end of lever 238 is adapted to be received into a recess of a pivoted clamp 242 supported on housing 222.

Thus, the air gun assembly 220 can be utilized for guiding the winch line through the conduit. For this purpose, the line has a mandrel or rabbit 244 attached to the free end thereof prior to insertion into the cable guide 230. After the mandrel or rabbit has been attached to the end of the winch line 112, the air gun access door is opened as illustrated in FIG. 9 and the line is inserted therein. The access door is then closed with the winch line in slot 230, as shown in FIG. 10. A flexible hose 246 is then connected to the quick disk connect coupling 223 and the opposite end of hose 246 is connected to an outlet of a mechanically driven blower unit that will now be described.

Air Blower Units

Figure 13:
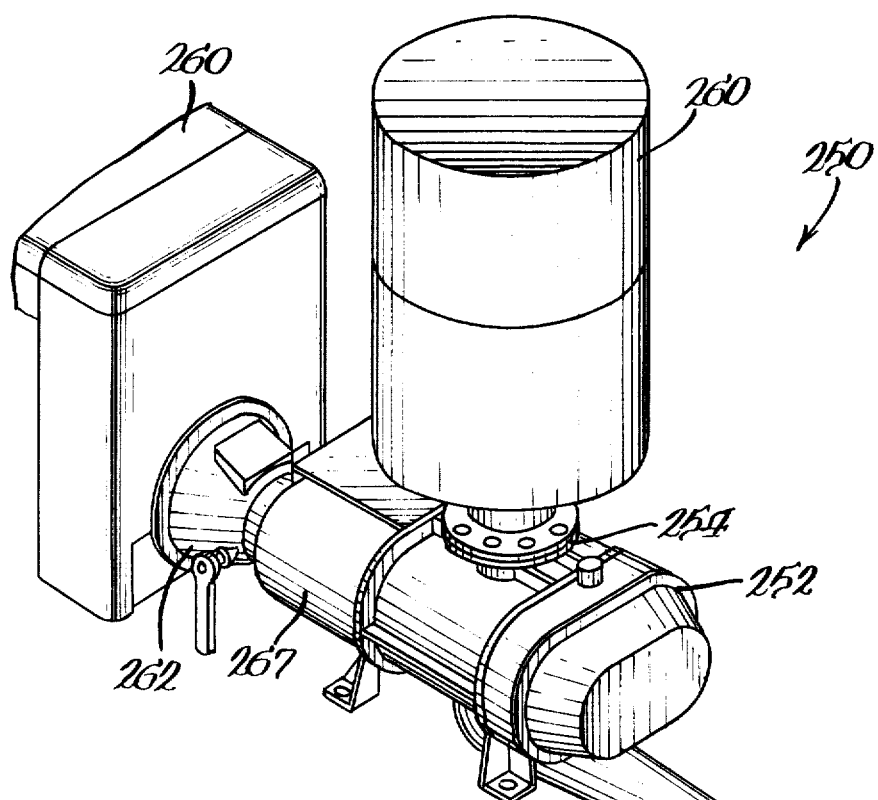
FIG. 13 is a perspective view of the blower unit.

The air blower unit 250 for supplying a large volume of air at low pressure to air gun 220 is illustrated in FIG. 13 and includes a compressor assembly 252 having an inlet 254 and an outlet which has a rigid discharge plenum 256 connected thereto which has an outlet end 258. A large air filter 260 is connected to the inlet 254 and compressor assembly 252 is driven by an engine 260 through a clutch 262 and a speed reduction unit 267.

The opposite end of conduit 246 (FIG. 12) is connected to outlet end 258 so that the large volume of air delivered by compressor assembly 252 is supplied to the air gun, as will be described later.

The apparatus also includes a ventilation blower 270 (FIG. 2) which has an outlet to which a flexible hose 272 is connected. Flexible hose 272 is normally stored in a rigid conduit section 274 adjacent the rear of the truck bed and is maintained therein by a door (not shown). Ventilation blower 270 is driven by a hydraulic motor, as will be described later.

Hydraulic Circuit

Figure 14:
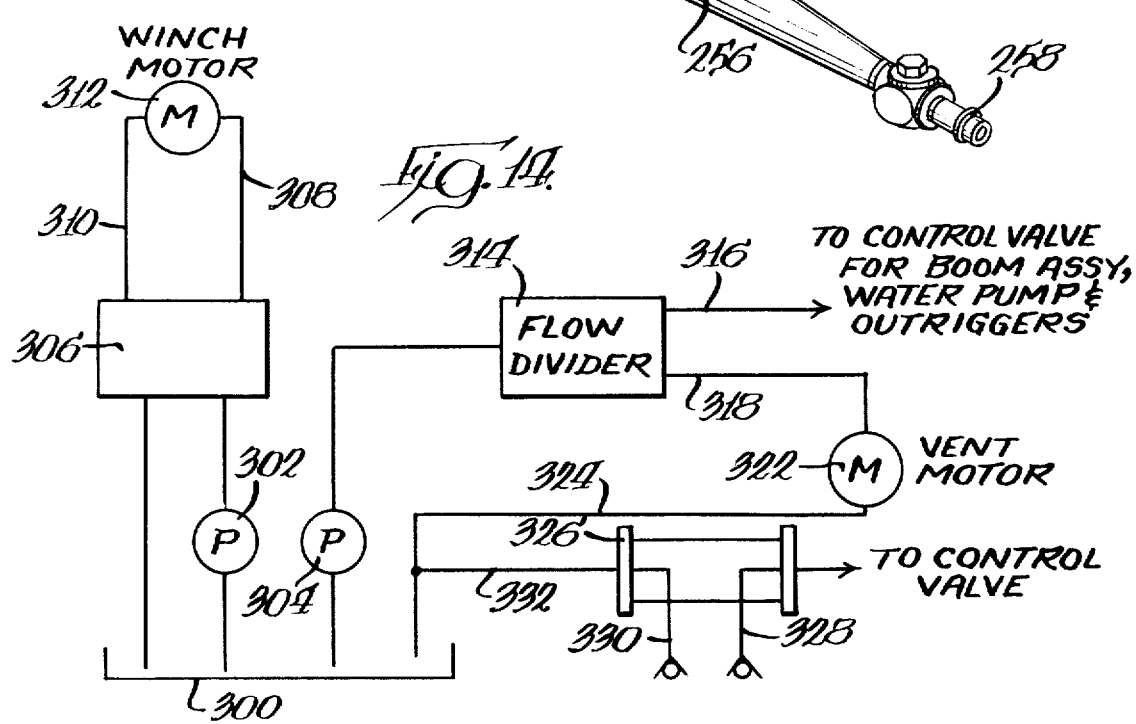
FIG. 14 is a schematic view of the hydraulic circuit.

The hydraulic circuit for driving the various components of the cable feeding apparatus is disclosed in FIG. 14, and includes a hydraulic fluid reservoir 300 connected to a double section hydraulic pump including first and second pumps 302 and 304. Pump 302 supplies pressurized hydraulic fluid to a valve 306 which is connected by conduits 308 and 310 to opposite sides of a winch motor 312.

Pump 304 supplies pressurized hydraulic fluid to a flow divider 314 which divides the flow from pump 304 equally to two outlet lines 316 and 318. Outlet line 316 is connected to the various hydraulic fluid rams through a valve bank that is utilized for manipulating the boom assembly that was described above. In addition, the pressurized fluid can also be utilized for extending and retracting hydraulically actuated outriggers 320 (see FIG. 1) and to operate the water pump.

Figure 2:
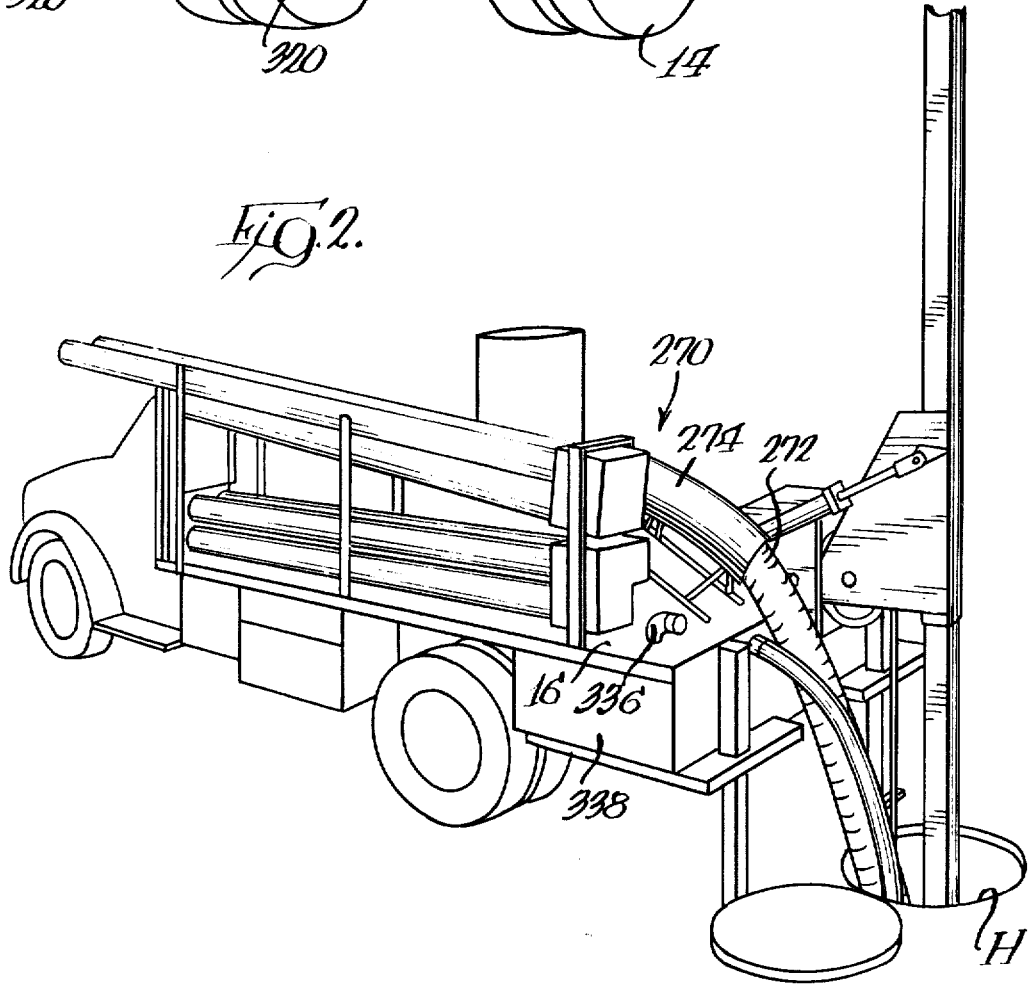
FIG. 2 is also a perspective view showing the equipment in the cable pulling position.

The second conduit 318 is connected to a hydraulic motor 322 which drives the ventilation blower 270 (FIG. 2). The outlet of ventilation motor 322 is connected by a conduit 324 to the hydraulic oil tank. Hose reel 326 has two sections of hose 328 and 330 supported thereon and has a return line conduit 332 connected to reservoir 300. Conduits 328 and 330 have quick disconnect couplings at the free ends thereof and are adapted to be attached to a submersible water pump (not shown), so that any water that is in the manhole can be readily removed.

According to one aspect of the invention, the hydraulic reservoir 300 is formed as part of the frame structure 12 for vehicle 10. As stated above, the frame structure 12 includes a horizontal frame portion that has a cradle 27 supported thereon adapted to support the vertical boom assembly in the stored position illustrated in FIG. 1. The frame structure 28 is designed to be of hollow rectangular configuration and is fluid sealed so that the frame structure defines the fluid reservoir 300 for the hydraulic fluid needed for driving the various components.

Operation

The operation of the cable feeding apparatus is believed to be understood from the above description but will be summarized at this point. Initially the operator manipulates the vehicle 10 to a position wherein the center of the manhole H (FIG. 2) is generally in line with the center line of the truck and is a short distance from the rear end of the bed 16. The engine 260 is then started which will operate both pumps 302 and 304 to supply the necessary pressurized hydraulic fluid for performing all of the remaining functions. After the engine or power unit is operating, the operator checks the manhole for any possible gases therein or water. If there is any water in the manhole, the operator attaches a water pump (not shown) to conduits 328 and 330, attaches a hose stored on bed 16 to the water pump and drops the submersible pump into the manhole to remove any water therefrom.

Next the operator opens the door to chute 274 which allows the flexible hose, which is connected to the ventilator blower 322, to drop into the manhole. This blower, which delivers pressurized fluid to be delivered from pump 304 to motor 322, operates at all times that the engine is running and acts to force any gases from the manhole.

The operator then initially supplies pressurized hydraulic fluid to fluid ram 58 to pivot the fluid ram from the position illustrated in FIG. 1 to the vertical position illustrated in FIGS. 2 and 3. Once the boom is in a generally vertical position illustrated in FIG. 3, the fluid ram 34 is manipulated to extend boom section 32 until such time as the center of the vertical boom 24 is generally aligned with the center of the manhole. As stated above, cradle 27 is resiliently supported on reservoir 300 and will flex if the horizontal boom 22 is inadvertently extended before the vertical boom is raised out of cradle 27.

In the event that the vertical boom 24 is laterally offset from the center of the manhole, the entire horizontal boom 22 can be shifted transversely to align the boom with the center of the manhole. If the axis of the vertical boom 24 is not aligned with the axis of the manhole, fluid rams 70 can be manipulated to tilt the boom in either direction and align the axis of the boom with the center of the manhole.

After proper positioning of the vertical boom 24, fluid ram 40 is actuated to extend boom section 38 into the manhole to a point where the lower periphery of the sheave or bull wheel 84 is aligned with the center of the conduit. In operation of manholes of normal depth, prior to insertion of the bull wheel or sheave 84 into the manhole, the arms 80 are pivoted on pin 82 on the lower end of boom section 38 to the position illustrated in FIG. 5. The bull wheel 84 is retained in this position by inserting pins through openings 90 in arms 80. Once the alignment has been made, the clevis is attached to the side wall of the manhole through a link chain L.

The next step in the operation is to operate hydraulic winch motor 312 sufficiently to position the guide block 166 of the level-wind mechanism centrally between opposite ends of the winch drum. The winch line is then unreeled manually and is entrained first over the idler sheave or roller 44 and then over the bull wheel 84. Rabbit 244 is then attached to the free end of the winch line 112; door 225 of air gun 220 is opened and line 112 is inserted therein. The end of the air gun 220 having the expansible rubber element 224 thereon, is then inserted into the end of the conduit and is clamped therein by manipulating slide mechanism 232 and lever 238. The lever is then clamped in position by latch 242 and one end of hose 246 is connected to quick-disconnect coupling 223. The opposite end of hose 246 is then connected to outlet end 258 of blower unit 250.

Clutch 262 is then engaged so that a high volume of air under low pressure is forced through the conduit and the air gun and forces the rabbit or mandrel 244 through the conduit. During this time, the winch drum is free wheeling so that there is virtually no friction which will retard the movement of the mandrel through the conduit. During such movement of the mandrel or rabbit through the conduit 230, the counter 216 records the number of revolutions that drum has made which are then displayed on indicator 216.

During the time the rabbit is traveling through the conduit 230, the operator sporadically uses the brake to maintain the winch line taut. When the rabbit exits the conduit, the winch line will go slack, a sharp pressure drop will be noticed on the pressure gage and the engine RPM will increase. At this time, the brake is immediately actuated to prevent any overrun of the winch cable. It has been observed that experienced operators can utilize the controls as necessary to perform smooth starts and stops of the rabbit and maintain the winch line taut at all times.

After the winch line exits from the opposite end of the conduit, the cable to be installed is attached to the free end thereof. It should be noted that in the preferred operation, a ring is inserted in the opposite manhole associated with the exit end of conduit 230 and a cable feeder tube is connected between the ring and the outlet end of the conduit 230. Thus, the rabbit will be discharged at ground level for easily attaching the cable to be installed on to the end thereof.

After the cable has been attached to the winch line, the brake is disengaged and the clutch for the winch drum is engaged to pull the cable through the conduit. During this operation, the operator manipulates the brake as well as the engine speed to insure a uniform pulling action of the cable through the conduit. Of course, during this time, the level-wind mechanism will be traversing axially of the drum 110 to insure a uniform distribution of the winch line on the winch drum. During the drawing of the cable onto the winch drum, the counter 210 will be subtracting revolutions of the winch drum and will give an indication to the operator when the cable has been pulled through the conduit and the end thereof is exposed.

In the event that the manhole is deeper than normal, the boom assembly is designed to extend farther into the manhole and an auxiliary path is provided for the winch line. As illustrated in FIG. 6, for a deeper manhole, bull wheel 84 is aligned with boom section 24. Winch line is then entrained over idler pulleys 91 and 92 before being entrained over bull wheel 84 and then directed toward a conduit under the vehicle.

The auxiliary path for winch line has significant advantages. Firstly, it allows the cable to be pulled to a point substantially above ground level without putting a reverse bend on the cable. This distance is defined by the length of boom section 36. It also allows operation in deeper manholes without interference since the vertical run of the winch is substantially parallel to the axis of the cable. Also, having pulley above boom section 36 allows it to be aligned with bull wheel 84.

If the conduit extends away from the vehicle in a deeper manhole, the winch line is entrained over auxiliary pulley 44 and under bull wheel 84 so that the winch line extends substantially parallel to boom section 24.

We claim:

1. A feeding device for feeding a line through an underground conduit comprising a pressurized pneumatic fluid source, an elongated hollow tubular member having an expansible element on one end adapted to be expanded into engagement with said underground conduit, means defining a guide slot from the periphery of said tubular member for guiding said line into said tubular member, a hinged door portion on said tubular member defining a portion of said guide slot and pivotable between open and closed positions for inserting said line into said guide slot, a mandrel adapted to be attached to said line and positioned in said underground conduit, a collar slidable on said tubular member and adapted to expand said expandable element into engagement with said underground conduit, said collar holding said door in a closed position when in a position to expand said expandible element, and means for connecting said pressurized pneumatic fluid source to an opposite end of said tubular member to propel said mandrel and line through said underground conduit.

2. A feeding device as defined in claim 1, in which said line is a winch line wound on a winch drum with winch line guide means between said drum and said tubular member.

3. A feeding device as defined in claim 2, in which said winch line guide means includes a boom having first and second interconnected articulated boom portions adapted to be moved between a substantially parallel stored position relative to each other and a substantially perpendicular operative position, each of said portions having telescoping sections adapted to be extended and retracted relative to each other, and means on said boom for guiding said winch line between said drum and said tubular member.

4. A feeding device as defined in claim 3, in which said last means includes a plurality of pulleys on one of said articulated portions defining alternate paths for said winch line.

5. A feeding device as defined in claim 3, in which said second boom portion is pivoted about a generally horizontal first pivot between said stored and operative positions, further including a coupling between said boom portions with said coupling defining a second pivot axis generally parallel to said first boom portion and perpendicular to said first pivot allowing said second boom portion to be tilted with respect to said first boom portion.

6. A feeding device as defined in claim 5, in which said coupling has a first guide pulley to guide said winch line generally parallel to said first boom portion and said second portion has a second pulley on one end adapted to be positioned in general alignment with said underground conduit so that said winch line is guided generally vertically from said first pulley to a position generally parallel to said underground conduit.

* * * * *